(12) United States Patent
Ball et al.

(10) Patent No.: US 7,099,135 B2
(45) Date of Patent: Aug. 29, 2006

(54) INTEGRATED INRUSH CURRENT LIMITER CIRCUIT AND METHOD

(75) Inventors: Alan Ball, Gilbert, AZ (US); David Briggs, Glendale, AZ (US); Suzanne Nee, Gilbert, AZ (US); Stephen Robb, Fountain Hills, AZ (US)

(73) Assignee: Semiconductor Components Industries, L.L.C, Phoenix, AZ (US)

( * ) Notice: Subject to any disclaimer, the term of this patent is extended or adjusted under 35 U.S.C. 154(b) by 331 days.

(21) Appl. No.: 10/287,831

(22) Filed: Nov. 5, 2002

(65) Prior Publication Data
US 2004/0085698 A1    May 6, 2004

(51) Int. Cl.
    *H02H 3/00*    (2006.01)
(52) U.S. Cl. ........................ 361/93.9; 361/58
(58) Field of Classification Search ............... 361/93.1, 361/93.2, 93.7, 93.8, 93.9, 58, 91.1, 91.2, 361/100, 101, 103
See application file for complete search history.

(56) References Cited

U.S. PATENT DOCUMENTS

| 5,105,251 | A | * | 4/1992 | Nakayama | 257/355 |
| 5,390,069 | A | * | 2/1995 | Marshall | 361/103 |
| 5,488,533 | A | | 1/1996 | Cassidy | 361/18 |
| 5,587,863 | A | * | 12/1996 | Bergstrom et al. | 361/93.1 |
| 5,877,617 | A | * | 3/1999 | Ueda | 323/316 |
| 6,108,182 | A | * | 8/2000 | Pullen | 361/89 |

* cited by examiner

*Primary Examiner*—Ronald W. Leja
(74) *Attorney, Agent, or Firm*—James J. Stipanuk; Robert F. Hightower

(57) ABSTRACT

An inrush current limiter circuit (20) includes a detection circuit (30) that produces a control signal ($V_{DRIVE}$) from a sense current ($I_{SENSE}$). A power transistor responds to the control signal and has a source (51) coupled to an input node (12) to receive a supply voltage (ground) and a drain (53) for routing a load current ($I_{LOAD}$) to an output node (45) as a protection signal ($V_{SW}$). A sense transistor responds to the control signal and has a source scaled to the source of the power transistor and coupled to the input node to route a portion of the load current to the output node as the sense current.

15 Claims, 3 Drawing Sheets

INTEGRATED INRUSH CURRENT LIMITER CIRCUIT AND METHOD

BACKGROUND OF THE INVENTION

The present invention relates in general to semiconductor devices and, more particularly, to high current semiconductor devices for limiting current surges on a power supply bus.

Telecommunications, network and computer applications often require the ability to insert and remove circuit cards from systems without powering down the entire system, often referred to as "hot swapping". In network equipment configured with a distributed power system, circuit cards often include large filter capacitors for reducing noise on the power rail or bus. During a hot swap, the capacitors can produce an inrush current spike that can, if not otherwise limited, reach hundreds of amperes of peak amplitude, which can damage the circuit card or its connector. Moreover, such a large inrush current can cause a power disturbance that damages other circuit cards that are plugged into the system or result in a data loss or other system malfunction. To prevent such deleterious effects, hot swappable circuit cards typically are formed with inrush current limiting circuits that control a power MOSFET switch through which is routed the supply current.

Existing inrush current limiters suffer from a high cost due to a large number of components needed to control the power MOSFET switch in a fashion that achieves a limits the inrush current to a specified level. Most inrush current limiters use a low value sense resistor coupled in series with the power MOSFET switch to limit the peak value of the supply current. However, a large current flow through the switch and sense resistor results in a high power dissipation that can adversely affect reliability.

Hence, there is a need for an inrush current limiter that reduces the component count in order to reduce the manufacturing cost while achieving a high reliability by reducing power dissipation.

DETAILED DESCRIPTION OF THE DRAWINGS

In the figures, elements having the same reference number have similar functionality.

Figure 1:
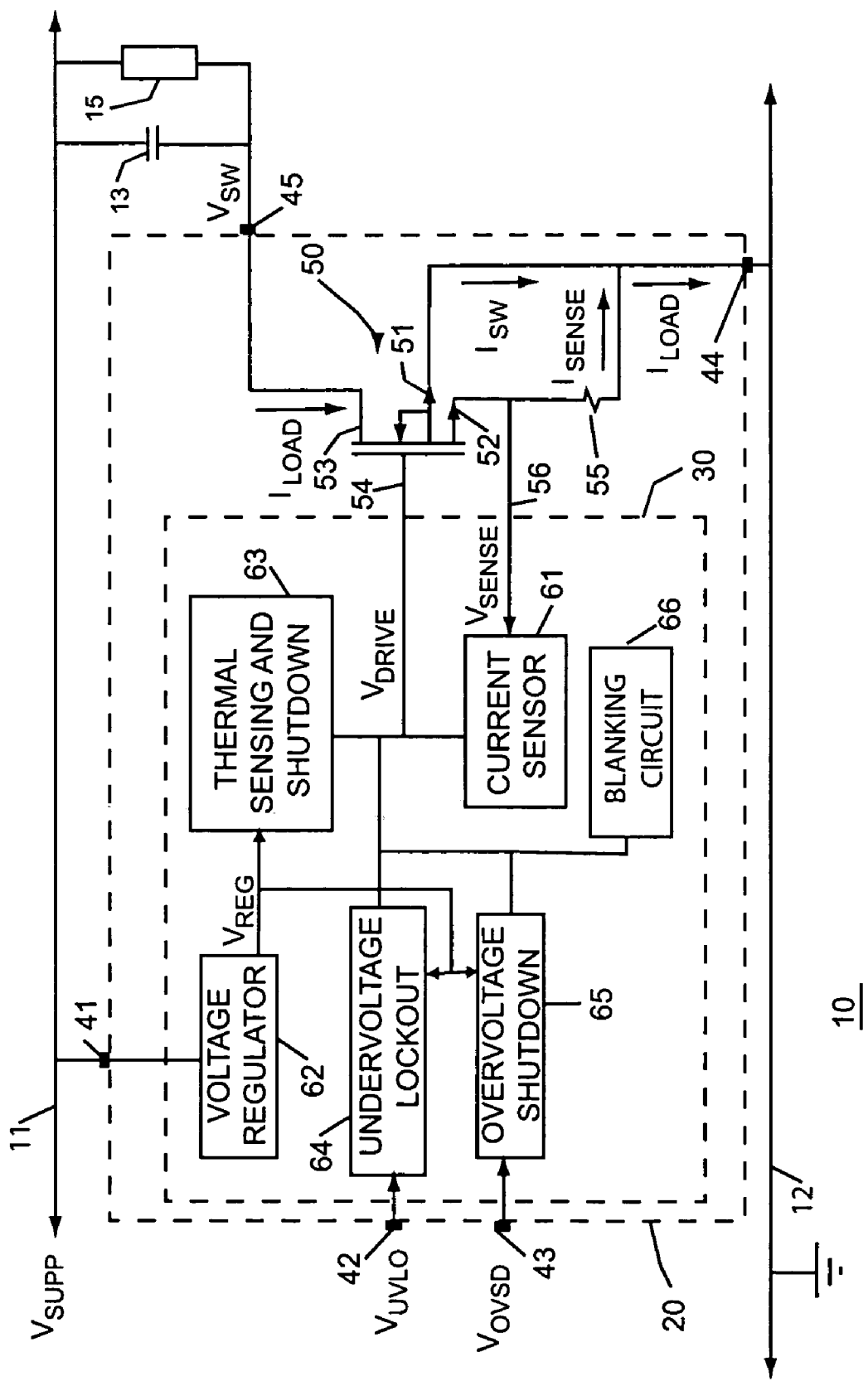
FIG. 1 is a schematic diagram of an electronic system including a hot swap card.

FIG. 1 is a simplified schematic diagram of a hot swappable circuit card 10 for plugging and/or unplugging into an electronic system while power is applied between a distributed power bus 11 operating at a power supply voltage $V_{SUPP}$=48.0 volts and a ground node 12. Power bus 11 and ground node 12 may concurrently be supplying power to other components (not shown) of the electronic system.

A large filter capacitor 13 smooths out noise spikes on power bus 11 to provide stable biasing. A circuit that performs a function of circuit card 10 is shown as a load 15 that draws a load current $I_{LOAD}$ from power bus 11 through an inrush current limiter circuit 20. In one embodiment, load 15 includes a voltage regulator drawing a load current $I_{LOAD}$=10.0 amperes as a peak value through capacitor 13 and load 15. A typical average value of $I_{LOAD}$ is about four amperes. In one embodiment, capacitor 13 has a value of about one thousand microfarads. When circuit card is hot swapped, current $I_{LOAD}$ flows into capacitor 13 to charge it to the value of $V_{SUPP}$. Inrush current limiter circuit 20 limits the peak value of $I_{LOAD}$, which could otherwise reach one hundred amperes or more, to a value of about ten amperes.

Inrush current limiter 20 includes a detection circuit 30 that controls a mirrored power transistor 50 through which load current $I_{LOAD}$ is routed to capacitor 13 and load 15. In one embodiment, inrush current limiter 20 is formed on a semiconductor substrate as an integrated circuit having five external leads 41–45.

Mirrored transistor 50 is formed as a vertical power MOSFET transistor having a power source 51, a sensing source 52, a common drain 53 and a common gate 54. Power source 51 and sensing source 52 are mirrored or scaled to conduct proportional components $I_{SW}$ and $I_{SENSE}$, respectively, of $I_{LOAD}$. In one embodiment, transistor 50 has a gate to source conduction threshold of about one volt. In one embodiment, the effective sizes of power source 51 and sensing source 52 are scaled in a ratio of 1000:1, so peak values of current $I_{SW}$=9.990 amperes and $I_{SENSE}$=10.0 milliamperes, approximately, when $I_{LOAD}$=10.0 amperes.

An integrated sense resistor 55 is coupled in series with sensing source 52 to develop a sense voltage $V_{SENSE}$ with sensing current $I_{SENSE}$ at a node 56. In one embodiment, resistor 55 has a resistance of about ten ohms, so $V_{SENSE}$ has a value of about one hundred millivolts and a corresponding power dissipation of about one milliwatt when $I_{SENSE}$=10.0 milliamperes.

Detection circuit 30 includes a current sensor 61, a voltage regulator 62, a thermal shutdown circuit 63, an undervoltage lockout (UVLO) circuit 64, an overvoltage shutdown (OVSD) circuit 65 and a blanking circuit 66.

Voltage regulator 62 is configured as a standard shunt regulator coupled between ground lead 41 and power supply lead 44 to provide an internal supply voltage $V_{REG}$ for biasing detection circuit 30.

Current sensor 61 indirectly senses $I_{LOAD}$ with an error amplifier that receives $V_{SENSE}$ as a feedback signal and produces a representative drive control signal $V_{DRIVE}$ at gate 54. In effect, current sensor 61 operates by routing a scaled portion of $I_{LOAD}$ through sensing source 52 as $I_{SENSE}$ and adjusts $V_{DRIVE}$ to limit the magnitude of load current $I_{LOAD}$ to a predetermined maximum value of, e.g., ten amperes.

The operation of inrush current limiter 20 proceeds as follows. During a hot swap insertion of circuit card 10, capacitor 13 is substantially discharged and an output voltage $V_{SW}$ is produced on drain 53 at nearly the level of $V_{SUPP}$. Capacitor 13 presents a low impedance load to inrush current limiter 20, which in response supplies the maximum predetermined value of $I_{LOAD}$, for example, ten amperes, to charge capacitor 13. In effect, transistor 50 operates as a constant current source until capacitor 13 is charged to $V_{SUPP}$, at which point $V_{DRIVE}$ is increased to the $V_{REG}$ level and mirrored transistor 50 is in a fully conducting state. Because of the current limiting feature, excessive loading of supply voltage $V_{SUPP}$ is avoided, so output voltage Vsw is referred to as a protection signal.

By limiting the inrush current to a maximum specified value with transistor 50, inrush current limiter prevents an overload condition on power bus 11 that could cause a system malfunction. Because $I_{LOAD}$ is sampled with a lowvalued sense current $I_{SENSE}$, rather than being sensed directly, only a small amount of power is dissipated through sense resistor 55, thereby providing a high efficiency. Moreover, the external component count is reduced because resistor 55 is readily integrated on the same die as other components of inrush current limiter 20, which reduces the overall cost of circuit card 10.

UVLO circuit 64 includes a threshold comparator that senses the magnitude of supply voltage $V_{SUPP}$ and maintains transistor 50 in an off state until $V_{SUPP}$ rises above a predetermined level. The predetermined lockout level is set with an internal voltage divider coupled to lead 42 to provide a divided voltage $V_{UVLO}$ that can be adjusted with one or more external resistors. An output coupled to gate 54 is configured with an open drain arrangement that pulls gate 54 down to approximately ground potential when an undervoltage condition is detected. Once an undervoltage condition is sensed, hysteresis circuitry maintains transistor 50 in an off state until $V_{SUPP}$ rises above a second predetermined shutdown level, thereby preventing rapid cycling and/or oscillations. In one embodiment, where $V_{SUPP}$ operates at forty-eight volts, the predetermined lockout level is set to a value of about thirty-two volts.

OVSD circuit 64 operates on a fashion similar to that of UVLO circuit 63, except that a threshold comparator senses the magnitude of $V_{SUPP}$ and disables detection circuit 30 and transistor 50 if $V_{SUPP}$ rises above a first predetermined shutdown level set with an internal voltage divider that provides a divided voltage $V_{OVSD}$ at lead 43 to allow adjustment with one or more external resistors. An output coupled to gate 54 is configured with an open drain arrangement that pulls gate 54 down to approximately ground potential when an overvoltage condition is detected. Once an overvoltage condition is sensed, hysteresis circuitry maintains transistor 50 in an off state until $V_{SUPP}$ falls below a second predetermined shutdown level, thereby preventing rapid cycling and/or oscillations. In one embodiment, where $V_{SUPP}$ operates at forty-eight volts, the first predetermined shutdown level of $V_{OVSD}$ is set to be about ninety-five volts and the second predetermined shutdown level is set to a value of about ninety volts.

Thermal shutdown circuit 63 includes a temperature sensor formed on the same semiconductor substrate as detection circuit 30 and mirrored transistor 50. The temperature sensor circuitry preferably is disposed adjacent to power source 51 or embedded within the layout of transistor 50, i.e., close to where the most heat is being generated, in order to sense the temperature of the hottest portion of inrush current limiter 20. An open drain output pulls gate 54 down to approximately ground potential when the temperature rises to an upper threshold temperature. Once an overtemperature condition is sensed, temperature hysteresis circuitry ensures that mirrored transistor 50 remains turned off until the temperature falls below a lower threshold temperature. In one embodiment, the upper threshold temperature is about one hundred eighty degrees Celsius and the lower threshold temperature is about one hundred seventy degrees Celsius.

Blanking circuit 66 includes a resistor-capacitor network to set a time constant that maintains inrush current limiter 20 and transistor 50 in an off state for a delay period after a hot swap card insertion. This startup delay avoids a startup malfunction by allowing internal nodes to stabilize before circuit card 10 receives power through inrush current limiter 20. An output has an open drain configuration that switches gate 54 to ground potential during the startup delay. In one embodiment, the delay period is about two microseconds.

Figure 2:
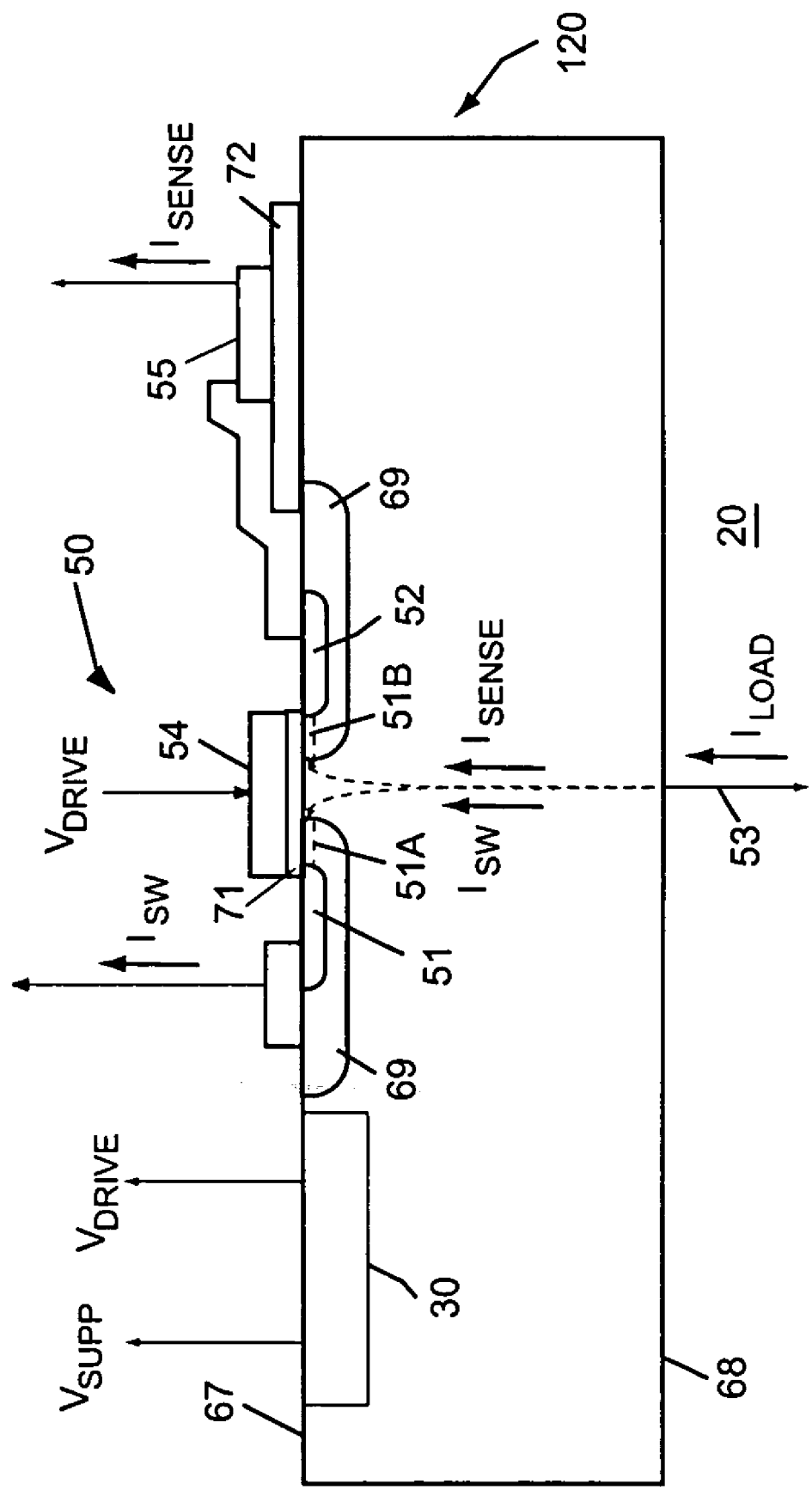
FIG. 2 is a cross-sectional view of an inrush current limiter circuit.

FIG. 2 is a simplified cross sectional view of inrush current limiter 20 formed on a semiconductor substrate 120 as an integrated circuit including transistor 50, resistor 55 and detection circuit 30.

Transistor 50 is implemented as a vertical device to achieve a small die area. Hence, sources 51–52 are formed as n-type doped regions within p-type well regions 69 on a top surface 67 of substrate 120. Common gate 54 is formed over a gate oxide layer 71 to control the conduction of an underlying power channel 51A and sense channel 51B along top surface 67 within well regions 69 operating at ground potential and coupled together out of the view plane of FIG. 2. Note that although sources 51 and 52 are shown as having a similar size in the figure, source 52 typically is scaled to a much smaller effective size than source 51. Drain 53 is formed on a second surface 68 of substrate 120 so that currents $I_{SW}$ and $I_{SENSE}$ flow from surface 67 through channels 51A and 52A, respectively, and through substrate 120 to drain 53 at second surface 68 as shown. The vertical structure of transistor 50 provides a low on-resistance and a small die size, resulting in a high performance and low fabrication cost.

Resistor 55 is formed on surface 67. In one embodiment, resistor 55 is formed by depositing and patterning a polysilicon layer over a dielectric layer 72 as shown.

Detection circuit 30 components are also formed on surface 67 and may or may not underlie resistor 55. Transistors are formed in one or more well regions that may be distinct from well regions 69. The temperature sensor in thermal shutdown circuit 63 is formed in close proximity to transistor 50 for thermal sensing the temperature of substrate 120 with a high degree of accuracy.

Figure 3:
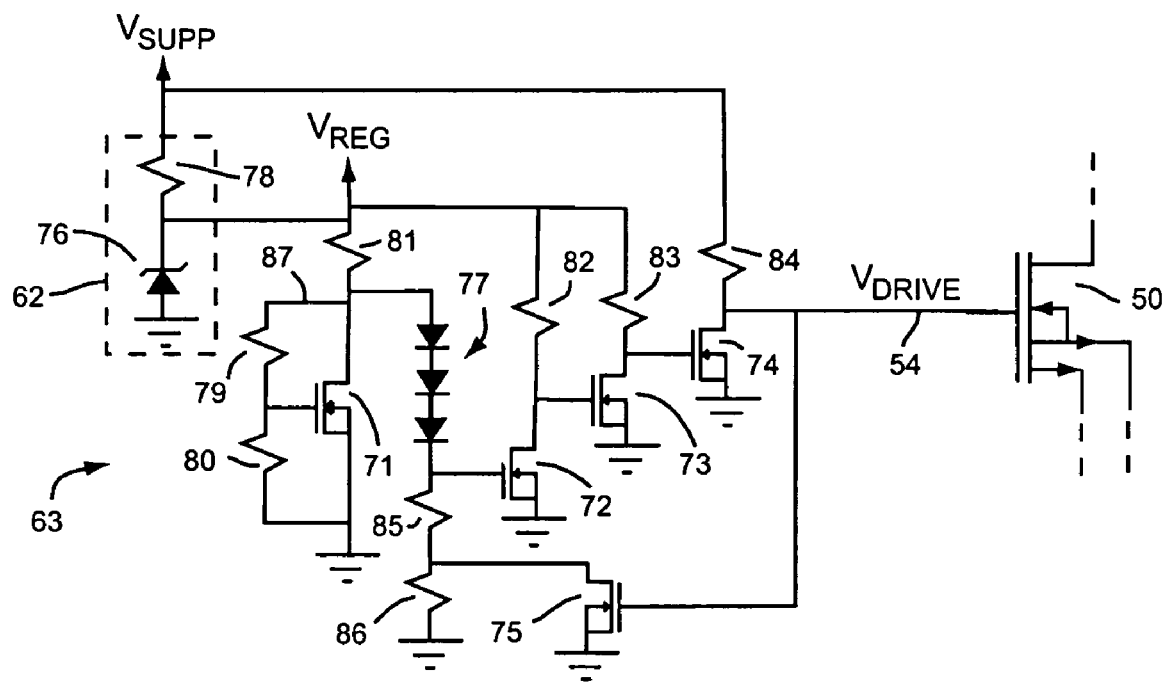
FIG. 3 is a schematic diagram showing a detail of the inrush current limiter including a shunt regulator and a thermal sensing and shutdown circuit.

FIG. 3 is a schematic diagram showing voltage regulator 62 and thermal shutdown circuit 63 in further detail, including transistors 71–75, zener diode 76, a diode string 77 and resistors 79–86.

Voltage regulator 62 operates as a shunt regulator developing an internal regulated voltage $V_{REG}$=12.0 volts, approximately, across zener diode 76. Zener diode 76 has a positive temperature coefficient of voltage.

Transistor 71 and resistors 79–80 operate as a shunt regulator that establishes a voltage $V_{87}$ at a node 87 that has a negative temperature coefficient of voltage. In one embodiment, $V_{87}$=2.7 volts when the substrate 120 temperature is twenty-five degrees Celsius. The voltage dropped across diode string 77 decreases with temperature, so the voltage at the gate of transistor 72 increases with temperature.

Transistors 72–74 combine with resistors 82–84 to function as a three stage amplifier that switches gate 54 to about ground potential to turn off transistor 50 when the temperature reaches the upper threshold level. In one embodiment, the thermal shutdown temperature is set at about one hundred eighty degrees Celsius. Transistor 75 and resistors 85–86 provide temperature hysteresis of about ten degrees Celsius to prevent thermal oscillations.

Figure 4:
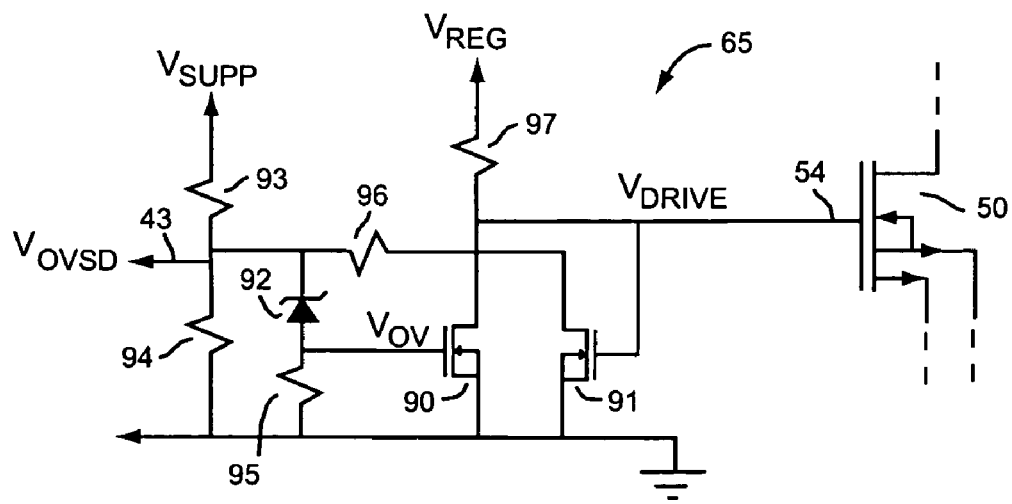
FIG. 4 is a schematic diagram of an overvoltage shutdown circuit of the inrush current limiter circuit.

FIG. 4 is a schematic diagram showing overvoltage shutdown circuit 65 in further detail. Resistors 93–94 operate as a voltage divider that divides supply voltage $V_{SUPP}$ to provide divided voltage $V_{OVSD}$ at lead 43. A zener diode 92 level shifts $V_{OVSD}$ to provide an overvoltage detection signal $V_{OV}$ at the gate of a transistor 90. When $V_{SUPP}$ exceeds a predetermined voltage, $V_{OV}$ exceeds the conduction threshold of transistor 90, which turns on transistor 90 to switch gate 54 to ground potential to turn off transistor 50 and disable inrush current limiter 20. Once transistor 50 is turned off, transistor 91 switches resistor 96 in parallel with resistor 94 to provide a voltage hysteresis that avoids oscillations and/or false triggering on gate 50 due to $V_{SUPP}$ noise. In one embodiment, transistor 50 is turned off when $V_{SUPP}$ reaches a predetermined level of about ninety-five volts, with about five volts of hysteresis. Note that lead 43 provides an external connection for a user to add an external resistor to adjust the predetermined overvoltage level.

Undervoltage lockout circuit 64 has a similar structure and operates in a similar fashion as overvoltage shutdown circuit 64 except that its internal logic is formed so that gate 54 is switched to ground potential when $V_{SUPP}$ is less than a predetermined undervoltage level. In one embodiment, the predetermined undervoltage level is set to about thirty-two volts.

In summary, the present invention provides an inrush current limiter integrated circuit that has a high reliability and a low cost. A detection circuit produces a control signal in response to a sense current. A power transistor operates in response to the control signal and has a source that receives a supply voltage and a drain that routes a load current of the supply voltage to an output node as a protected signal. A sense transistor operates in response to the control signal and has a source scaled to the first source and coupled to the input node for routing a portion of the load current to the output node as the sense current.

The power transistor and sense transistor are formed on a semiconductor substrate, with their respective sources and a common control electrode being formed on a top surface of the semiconductor substrate along with the detection circuit. The drain is formed as a common drain of the power and sense transistors, and is formed on a bottom surface of the semiconductor substrate so that the load current flows vertically through the substrate, i.e., from the top to the bottom surface. The vertical arrangement provides a small die area and low fabrication cost while providing the capability of switching currents of ten amperes or more. The detection circuit includes a temperature sensor and shutdown circuit as well as over- and undervoltage detection and shutdown. As a result, the invention provides a high degree of reliability.

What is claimed is:

1. An inrush current limiter circuit, comprising:
   a first transistor operating in response to a control signal and having a first source coupled to an input node to receive a supply voltage and a drain coupled to an output node of the inrush current limiter circuit wherein the output node is configured to be plugged to a power supply that concurrently is supplying the supply voltage, the drain coupled for routing a load current of the supply voltage to the output node as a protection signal, the first transistor also having a gate coupled to receive the control signal; and
   a second transistor operating in response to the control signal and having a second source scaled to the first source and coupled to the input node for routing a portion of the load current to the output node as a sense current, the second transistor having a gate that is common with the gate of the first transistor; and
   a detection circuit configured to receive the sense current and responsively form the control signal to operably limit a maximum value of current flow through the first transistor wherein the maximum value is greater than zero.

2. The inrush current limiter circuit of claim 1, further comprising a semiconductor substrate having a first surface for forming the detection circuit and at least the gate of the first transistor, and a second surface for forming a common drain of the first and second transistors.

3. The inrush current limiter circuit of claim 2, wherein the detection circuit includes a thermal sensor formed on the semiconductor substrate to monitor a temperature of the first transistor wherein the thermal sensor turns off the first and second transistors with the control signal when a temperature of the first transistor reaches a predetermined value.

4. The inrush current limiter circuit of claim 2, further comprising a resistor coupled to the second source for routing the sense current to develop a detection signal at an input of the detection circuit.

5. The inrush current limiter circuit of claim 1, wherein the first transistor has an effective size at least five hundred times an effective size of the second transistor.

6. The inrush current limiter circuit of claim 1, wherein the first transistor supplies at least ten amperes of load current.

7. The inrush current limiter circuit of claim 1, wherein the detection circuit adjusts an amplitude of the control signal to limit the load current to the maximum value.

8. An inrush current limiter for coupling first and second nodes, comprising:
   a semiconductor substrate having first and second surfaces;
   a mirrored transistor having a control electrode for receiving a control signal, first and second sources formed on the first surface and coupled to the first node, and a drain operably coupled to an output node of the inrush current limiter circuit wherein the output node is configured to be plugged to a power supply that concurrently is supplying the supply voltage, the drain formed on the second surface for routing a load current to the second node, wherein a sense signal is developed with a portion of a current flowing through the second source; and
   a detection circuit formed on the first surface of the semiconductor substrate, the detection circuit configured to receive the sense signal and responsively form the control signal that is coupled to the control electrode of the mirrored transistor and that operably limits a maximum value of current flow through the mirrored transistor without disabling the mirrored transistor.

9. The inrush current limiter of claim 8, further comprising a resistor coupled between the second source and the first node.

10. The inrush current limiter of claim 9, wherein the second source is coupled to an input of the detection circuit.

11. The inrush current limiter of claim 10, wherein the portion of the current flowing through the second source develops the sense signal across the resistor.

12. An inrush current limiter for coupling first and second nodes, comprising:
   a semiconductor substrate having first and second surfaces;
   a mirrored transistor having a control electrode for receiving a control signal, first and second sources formed on the first surface and coupled to the first node, and a drain formed on the second surface for routing a load current to the second node, wherein a sense signal is developed with a portion of the current flowing through the second source;
   a detection circuit formed on the first surface of the semiconductor substrate, the detection circuit configured to receive the sense signal an responsively form the control signal that is coupled to the control electrode of the mirrored transistor and that operably limits a maximum value of current flow through the mirrored transistor without disabling the mirrored transistor; and a blanking circuit for disabling the mirrored transistor for a time period after power is applied.

13. A method of limiting an inrush current, comprising:

routing a load current of a supply voltage through a first source of a mirror transistor to an output node;

sampling the load current with a second source of the mirror transistor to produce a sense signal, where the second source is scaled to the first source;

generating a control signal with a detection circuit in response to the sense signal wherein the control signal operably limits a maximum value of current flow through the mirror transistor to a non-zero value without disabling the mirror transistor; and configuring the detection circuit to delay enabling the mirror transistor for a period of time after the inrush current limiter receives the supply voltage.

14. The method of claim 13, wherein the step of generating includes the step of generating the control signal at a first surface of a semiconductor substrate.

15. The method of claim 14, wherein the step of routing includes the step of routing the load current from the first surface to a second surface of the semiconductor substrate.

* * * * *